Figure 1:
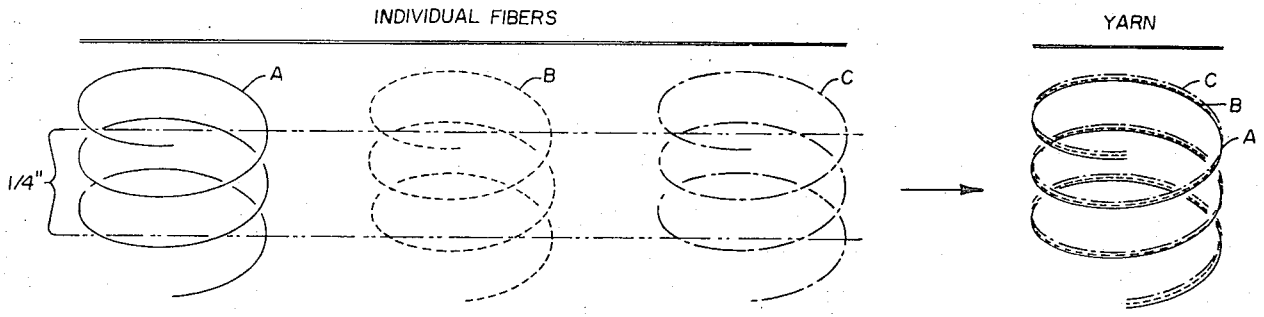
Figure 2:
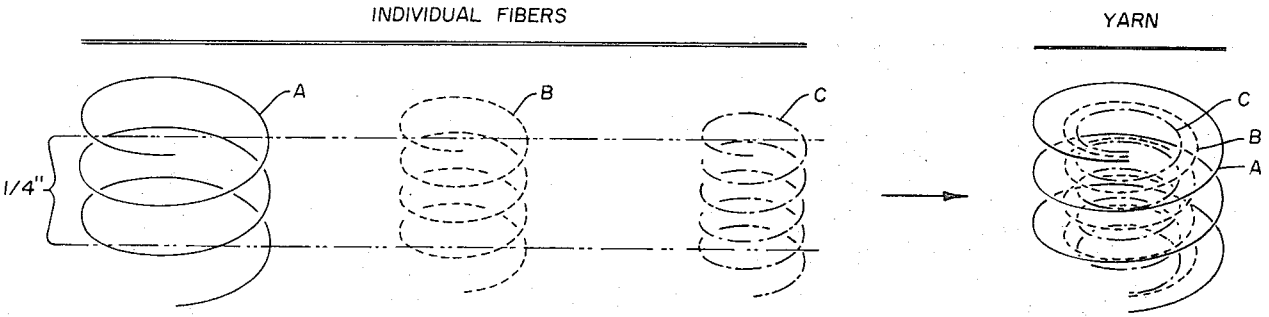
Figure 3:
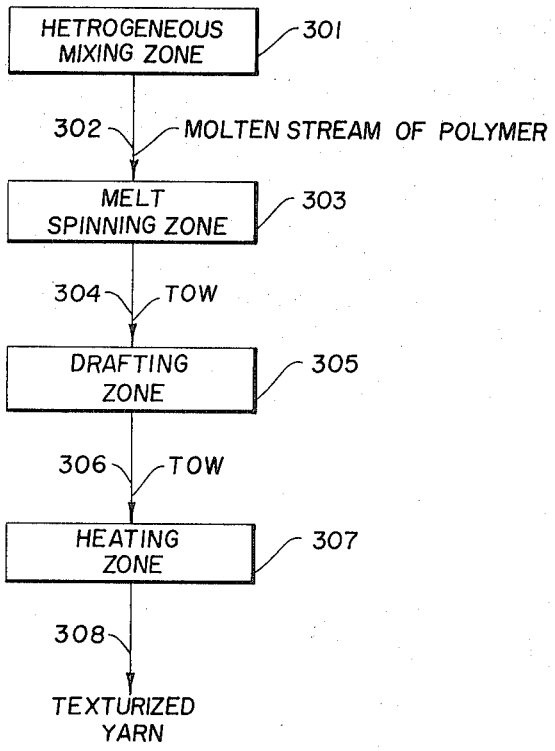
Figure 4:
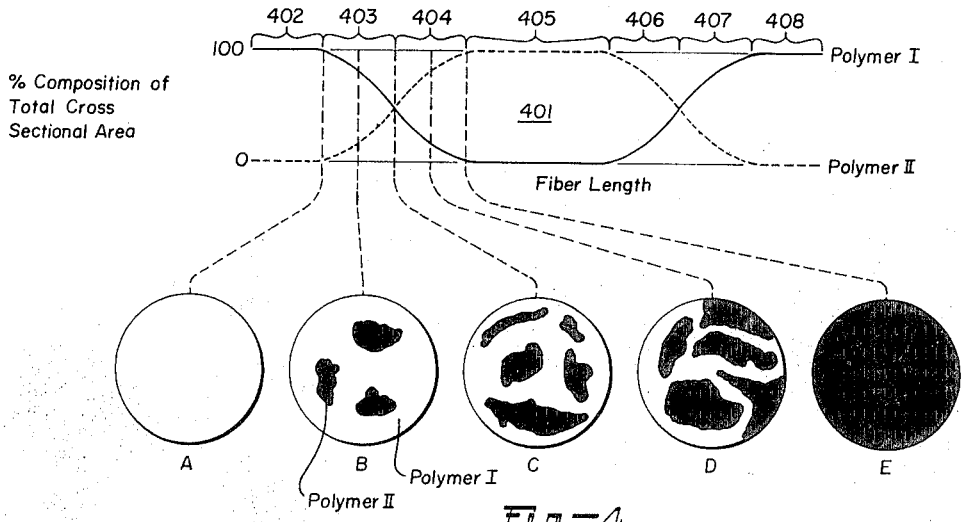
Figure 5:
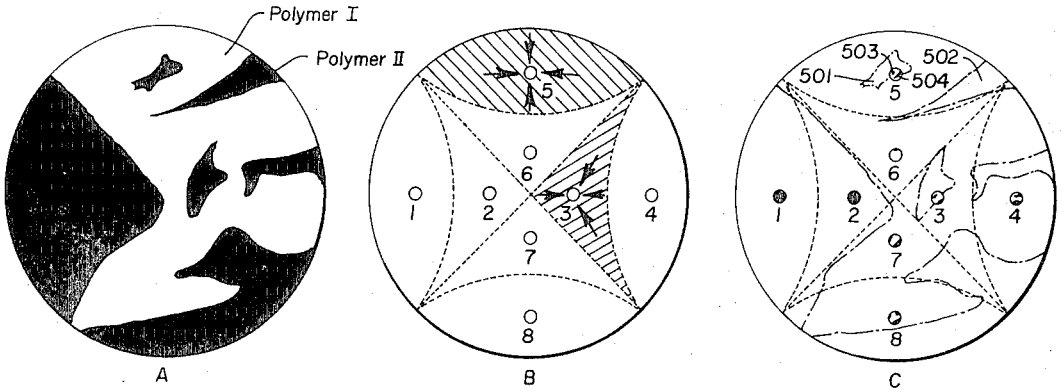
Figure 6:
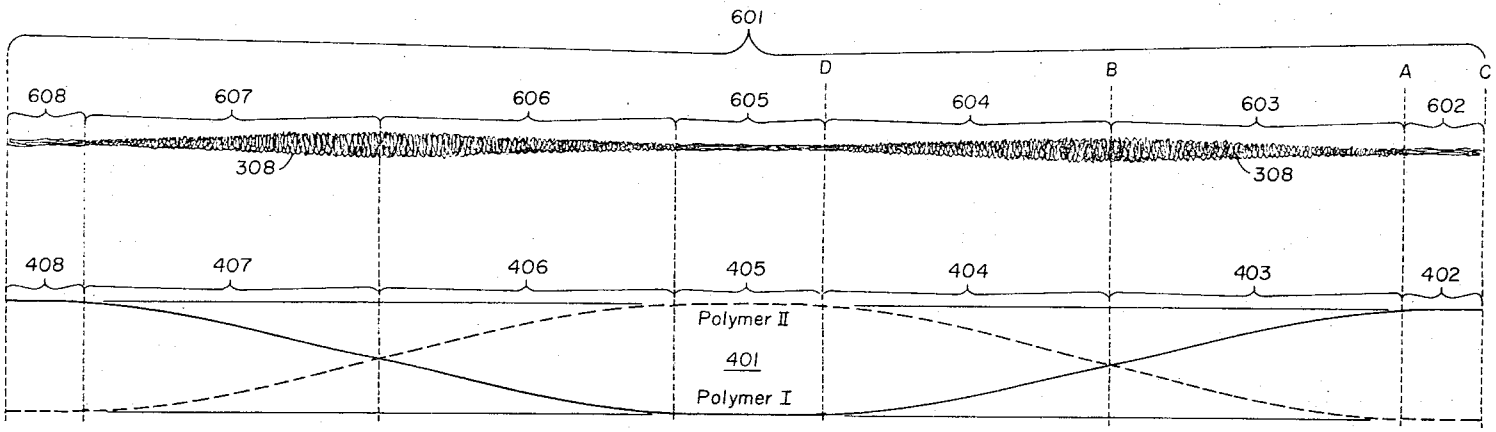
Figure 7:
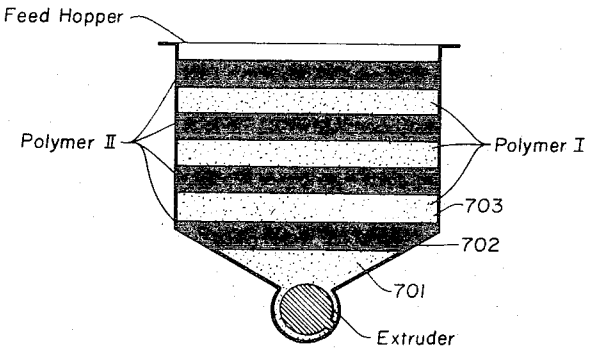
Figure 8:
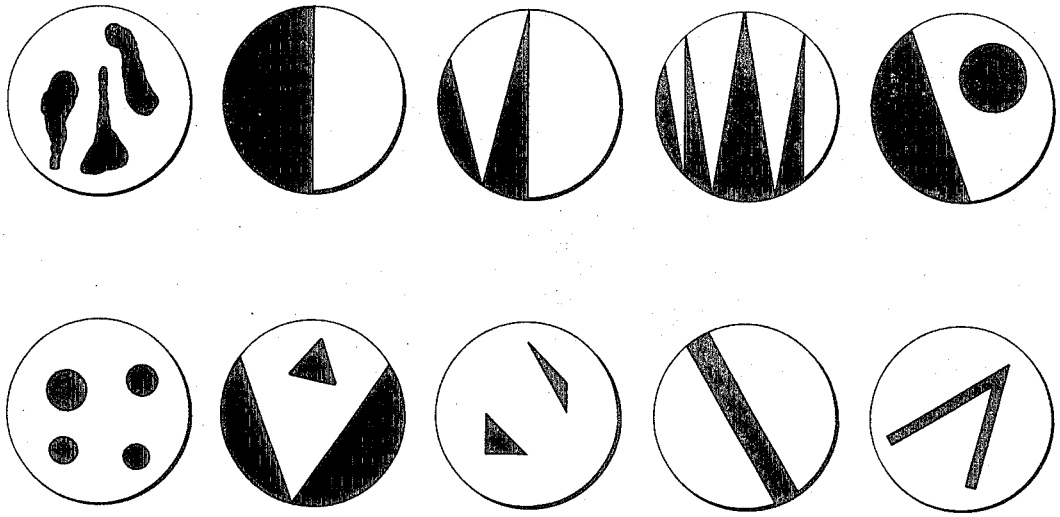
Figure 9:
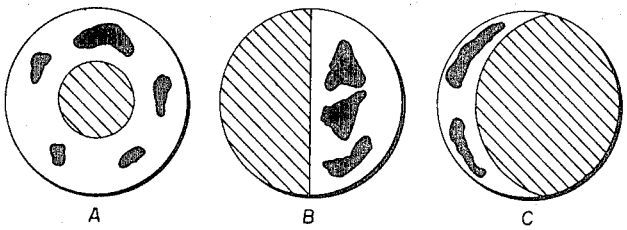
Figure 10:
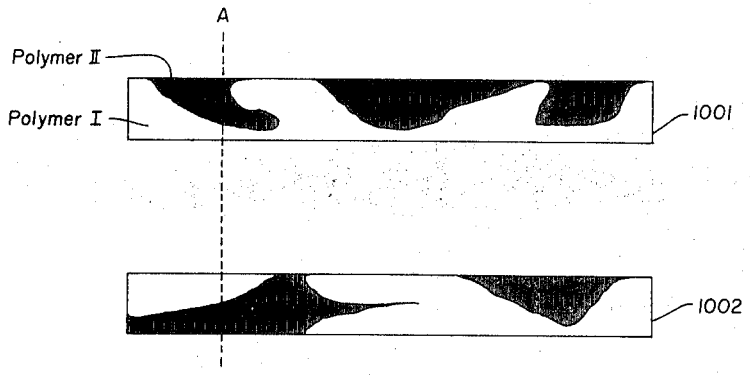
Figure 11:
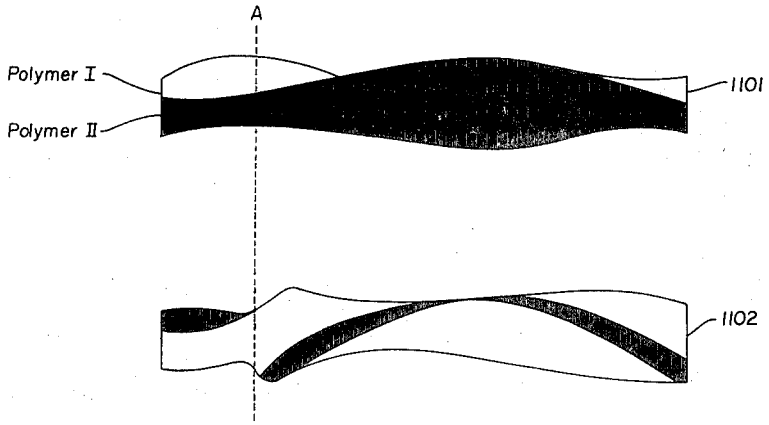

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 10, 1972

903 O.G. 373

T903,028

PROCESS FOR PRODUCING TEXTURIZED YARN

Bobby M. Phillips, 124 Bloomingdale Pike, Kingsport, Tenn. 37662

Filed June 3, 1971, Ser. No. 149,488

**Int. Cl. D02g *3/04***

U.S. Cl. 57—140 BY

6 Sheets Drawing. 38 Pages Specification

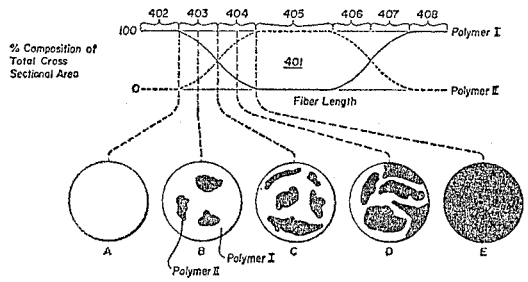

A texturized yarn is produced by forming a molten stream of polymer having a repeating unit of a first length of substantially a first polymer, a second length of a heterogeneous mixture of a major amount of the first polymer and a minor amount of a second polymer having a shrinkage characteristic different than the first polymer, a third length of a heterogeneous mixture of a minor amount of the first polymer and a major amount of the second polymer, a fourth length of substantially the second polymer, a fifth length of a heterogeneous mixture of a minor amount of the first polymer and a major amount of the second polymer, a sixth length of a heterogeneous mixture of a major amount of the first polymer and a minor amount of the second polymer, and a seventh length of substantially the first polymer. After the molten stream of polymer is produced, the process is continued by melt spinning a tow from the molten stream of polymer, drafting the melt spun tow, and heating the drafted tow at self crimping conditions to produce a texturized yarn. The texturized yarn of this invention is characterized by repeating lengths of a cross section of a plurality of helically crimped bicomponent melt spun textile fibers which have a suitable distribution of crimping characteristics at a cross section of the yarn to produce a texturized yarn and the yarn is further characterized by a unit which repeats along the longitudinal axis of the yarn, the unit being composed of a first non-texturized length characterized by a cross section of non-helically crimped substantially monocomponent textile fibers and a second textured length characterized by a cross section of helically crimped bicomponent textile fibers.

PROCESS FOR PRODUCING TEXTURIZED YARN

Filed June 3, 1971 6 Sheets-Sheet 1

BOBBY M. PHILLIPS
INVENTOR.

BY Charles H. Martin

ATTORNEY

PROCESS FOR PRODUCING TEXTURIZED YARN

Filed June 3, 1971 6 Sheets-Sheet 2

BOBBY M. PHILLIPS
INVENTOR.

BY Charles R. Watts

ATTORNEY

PROCESS FOR PRODUCING TEXTURIZED YARN

Filed June 3, 1971 6 Sheets-Sheet 3

BOBBY M. PHILLIPS
INVENTOR.

BY Charles R. Martin

ATTORNEY

PROCESS FOR PRODUCING TEXTURIZED YARN

Filed June 3, 1971 6 Sheets-Sheet 4

BOBBY M. PHILLIPS
INVENTOR.

BY Charles R. Morton

ATTORNEY

PROCESS FOR PRODUCING TEXTURIZED YARN

Filed June 3, 1971 6 Sheets-Sheet 5

BOBBY M. PHILLIPS
INVENTOR.

BY Charles F. Horton
ATTORNEY

PROCESS FOR PRODUCING TEXTURIZED YARN

Filed June 3, 1971 6 Sheets-Sheet 6

BOBBY M. PHILLIPS
INVENTOR.

BY Charles R. Morton
ATTORNEY